UNITED STATES PATENT OFFICE.

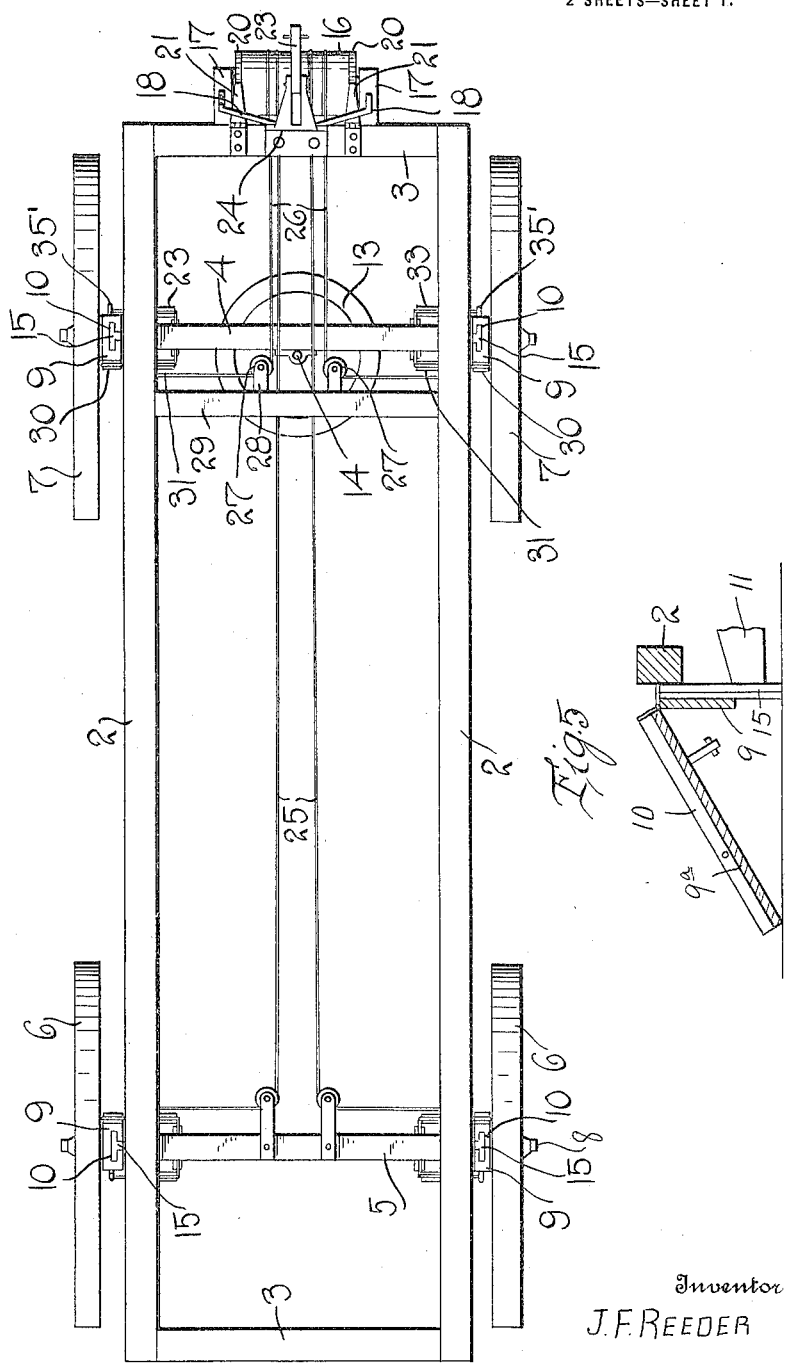

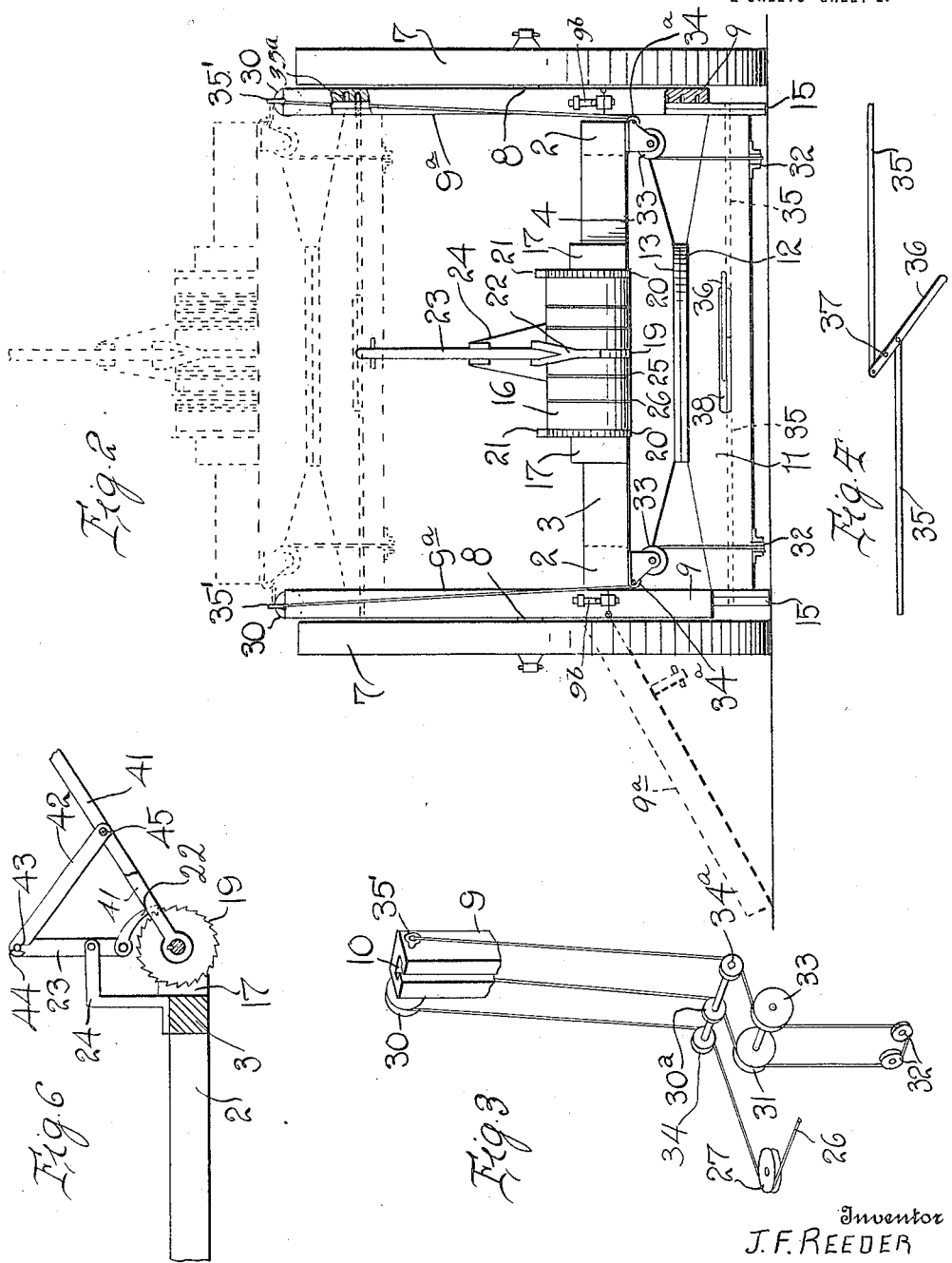

JOHN F. REEDER, OF SHELBYVILLE, ILLINOIS.

ADJUSTABLE DRAY OR TRUCK.

1,180,427.  Specification of Letters Patent.  Patented Apr. 25, 1916.

Application filed March 20, 1915. Serial No. 15,879.

*To all whom it may concern:*

Be it known that I, JOHN F. REEDER, a citizen of the United States, residing at Shelbyville, in the county of Shelby and State of Illinois, have invented certain new and useful Improvements in Adjustable Drays or Trucks, of which the following is a specification, reference being had to the accompanying drawings.

My invention relates to wagons, and more particularly wagons, drays, or trucks intended for the carriage of merchandise.

The primary object of my invention is the provision of a supporting element carrying a vertically adjustable platform or body, whereby the platform or body may be loaded when it is lowered and then raised to a predetermined height.

Still another object of my invention is the provision of means, in a truck or dray of the character stated whereby the body of the truck may be lowered to within a short distance from the ground in order to be loaded, and then may be raised in such a position that the fore wheels of the truck may cut under the body.

Still another object of the invention is the provision of an apparatus of the character described wherein, by means of a winding drum and cables, the body may be raised or lowered, the cables and winding drum being conjoined with pulleys whereby to secure a relatively great leverage, thus permitting the body or platform even when heavily loaded to be readily raised to its highest position.

A still further object of the invention is the provision of a truck wherein the body is supported upon what may be termed a movable section of the axle, this movable section in turn having a sliding engagement with fixed wheel-supported sections of the axle, the forward end of the body being rotatably connected to the movable axle by means of the fifth wheel to thus permit the forward wheels to turn and cut under the body of the truck.

Still another object of the invention is the provision of a skid operatively connected to the frame of the body and adapted to be turned down into an inclined position when the body is lowered to thereby provide for the rolling of barrels or other articles up the skid on to the truck.

Still another object is the provision in a truck or dray having a vertically movable body or platform and supporting wheels, of members forming skids, when the platform or body is lowered, to which members the wheels are detachably connected so as to be removed when the members are used as skids.

Other objects will appear in the course of the following description.

My invention is illustrated in the accompanying drawings, wherein:

Figure 1 is a plan view of my improved elevating truck; Fig. 2 is a front end elevation showing, in dotted lines, the truck elevated; Fig. 3 is a perspective view showing the manner in which the cords pass to the several pulleys and to the winding drum; Fig. 4 is a detailed plan view of the locking means; Fig. 5 is a transverse section through the longitudinal bar 2, the section 9ª, and illustrating the upper section turned down to form a skid; Fig. 6 is a side view with parts in section, showing a slightly different arrangement of the winding drum and its operating lever, hereinafter more specifically referred to.

Referring to the drawings, it will be seen that my invention comprises a body which includes the longitudinal framing or supporting members 2, and the transverse end cross pieces 3. The drawing merely shows the supporting framework of the truck, and the body of the truck may be constructed in any suitable manner. Extending transversely across the frame formed by the members 2 are the bolsters, that is, the front bolster 4 and the rear bolster 5.

The numeral 6 designates the rear wheels, and the numeral 7 designates the forward wheels of the truck. These wheels are shown as of the same diameter, though the front wheels might be of a smaller diameter than the rear wheels, if desired. Each of the wheels 6 and 7 is mounted upon a stub axle 8 which projects outward from and is rigidly connected to the upper section 9ª of a vertically extending sectional standard 9, this standard having a T-shaped groove or recess formed on its inner face which is designated 10.

Disposed below the bolsters 4 and 5 are the movable axles 11. There is no difference between these axles, save that the forward axle 11 supports upon it a fifth wheel member 12, while the forward bolster 4 supports a confronting fifth wheel member 13, these members being held together by a king-bolt 14. It will thus be seen that the forward movable axle 11 has rotary movement relative to the forward bolster 4.

Carried upon the ends of the movable axles 11 are the vertically extending T-shaped guides 15 which have sliding engagement in the T-shaped grooves 10 formed on the inner faces of the standards 9. The standards 9 extend upward to the height of the wheels and downward nearly to the ground, and the movable axles 11 therefore have a range of vertical movement from a point adjacent to the ground to a point sufficiently high to carry the bolster 4 to a position sufficiently above the front wheels as will permit the front wheels to cut under the body of the wagon.

In order to provide for shifting the movable axles 11, the bolsters 4 and 5 and the body-supporting frame carried thereby vertically upward or downward, I provide a series of cables which are connected to the movable body and axles, as will be hereafter described, and which are also connected to a winding drum. This winding drum may be mounted upon the forward or rear end or middle of the body-supporting frame but is shown as mounted upon the forward end of the wagon body. The drum 16 is mounted in suitable supporting brackets 17 which are firmly braced by means of the braces 18. The middle of the winding drum is formed with ratchet teeth 19, and the ends of the drum are provided with ratchet teeth 20, with which the dogs 21 engage, these dogs acting to prevent a reverse rotation of the drum unless the dogs are raised. The ratchet teeth 19 of the drum are engaged by a dog 22 mounted upon a lever 23 which is pivoted in brackets 24. By oscillating this lever 23 the drum will be intermittently rotated.

Attached to the drum are a plurality of cables, two of the cables extending to the rear end of the wagon body and being designated 25, while the other pair of cables operate the front end of the wagon body and are designated 26. Both pairs of these cables are supported in the same manner and operate in the same manner and the operative connections for both pairs of cables are the same. Hence the description for one pair of cables will apply to the mounting and operation of the other pair of cables.

The cables 26, after they pass over the drum, extend to pulleys 27 mounted upon brackets 28 which are in turn mounted upon a cross bar or brace 29. From these pulleys 27 which are set horizontally, each cable passes outward (and under a pulley 34,) and each cable at its upper end passes over a pulley 30. Then the cable extends downward, passes laterally beneath a small pulley 30$^a$ mounted on one side of the bolster 4, then passes over a pulley 31 and downward to a point beneath the corresponding axle 11, then passes over pulleys 32 which are supported beneath the axle 11 and which extend beyond the axle 11, then the cable passes upward over a pulley 33, corresponding to the pulley 31, laterally outward around a pulley 34$^a$, corresponding to the pulley 34, and then upward and is attached at its upper end to the upper end of the standard 9. As illustrated, the end of the cable 26 is connected to the upper end of the standard 9 by means of a pin 35', but I do not wish to be limited to this construction.

Both of the cables 26 are mounted in the same manner. It will now be obvious that upon a rotation of the drum 16 in one direction, the cables 26 will be wound upon the drum and that as so wound the cables will be shortened and this will act to lift the movable axle 11, the bolster resting thereon, and the wagon body. Inasmuch as there are two pairs of cables 25 and 26, one pair connected operatively, as described, to the forward portion of the body, and the other operatively connected as described, to the rear end of the body, and inasmuch as these cables are both equally taut, it will be obvious that a rotation of the drum in one direction will cause an equal elevation of the wagon body both at the rear and forward ends and a rotation of the drum in the opposite direction will cause an equal lowering of the body. It will also be obvious that by operating the lever 23 the body may be lifted to such a height that the bolsters 4 and 5 will be carried high enough to permit the wheels of the dray or truck to turn or cut under the floor of the wagon.

In order to hold the wagon body in its raised position, or in its lowered position, I provide any suitable locking means, and, as illustrated, I provide the oppositely disposed bolts 35 which may be mounted within the axles 11, these bolts being adapted to be projected into engagement with perforations 35$^a$ formed in the standard 9. The bolts are operated by means of a bolt-operating lever 36, pivoted at 37 to the corresponding axle 11 and operating in a slot or recess 38 formed in said axle. Either one or two of these locking means may be used, as desired, mounted upon either or both of the axles.

In order that loads may be easily raised upon the platform or body of the truck, when it is lowered, I preferably form the standards in two sections 9 and 9$^a$, which may be either turned up to the position shown in full lines in Fig. 2, or turned down to the dotted line position. Pins 9$^b$ are provided on each side of the standards so as to hold the upper section of each standard in engagement with the lower section of the standard when the upper section is raised to a vertical position. When the upper sections of the standards are turned outwardly and downwardly, it is obvious that they will thus form skids, as indicated in dotted lines in Fig. 2, and in full lines in Fig. 5. When it is desired to effect this result, the body is moved to its lowermost position and at that time, as clearly illustrated in Figs. 2 and 5, the T-shaped guides 15 rest upon the ground, and the standards may be allowed to slip downwardly upon the guide members 15 and thence be locked in place by the locking bolts 35, or the sections 9 may be allowed to slip down until they rest upon the ground, providing the sections 9 are long enough to support the sections 9ª in a position conjoined with the supporting members 2 forming the body or floor of the wagon. The wheels are held in place upon the stub axles by pins which may be removed in order to permit removal and replacement of the wheels, and obviously when the sections 9ª are swung out to form the skids above referred to, the wheels are removed, the parts being then supported as hereinafter described.

While for ordinary trucks and drays a simple lever is all that is necessary in order to raise or lower the body of a wagon, where heavy loads are disposed upon the wagon body it is necessary to provide a compound lever for operating the device, and to this end I use, in connection with my elevating mechanism, the attachment illustrated in Fig. 6, this attachment comprising the lever 41 of relatively great length pivotally supported at its forward end upon the axle of the winding drum and adjacent its rear end being provided with a pivoted link 42 which at its extremity is provided with a hook 43 adapted to engage with a pin 44 formed upon the extremity of the lever 23. Preferably there are two of these levers 41 disposed at each side of the body connected by a cross bar 45 to the two links 42 in pivoted engagement one on each side of the lever 23.

It will be seen from the construction above described that my invention is very simple in its construction and may be readily applied to ordinary types of wagons and that by this means the body of the truck may be readily raised or lowered to permit the easy loading or unloading of the truck and at the same time permit the forward wheels to cut under and turn.

The locking bolts 35 on axle 11 slip through member 15 and into the perforations 35ª on standards 9 to thereby take weight off cables 25 and 26 so they can be released so as to allow the truck wheels to turn under body.

While I have illustrated what I believe to be the best form of my invention, and one which I believe to be particularly efficient, I do not wish to be limited to the details of construction therein illustrated, as various modifications might be made without departing from the spirit of the invention.

Having thus described my invention, what I claim is:

1. In an apparatus of the character described, vertically disposed standards formed in two hinged sections, a body, guide members operatively connected to the body and engaging said standards and depending below the body to thereby rest upon the ground when the body is lowered, supporting wheels detachably mounted upon the upper sections of the standards, releasable means for holding the standard sections in registry and the upper sections in a vertical position, and means operatively supported upon the body and adapted to engage the lower sections of the standards for holding the body in a vertically adjusted position and for holding the standards and the body from relative movement, and means for raising or lowering the body with relation to the standards.

2. A mechanism of the character described including vertically disposed forward and rear pairs of standards, a body, vertically movable between said standards, means for guiding the body upon said standards for vertical movement, a pulley in conjunction with the upper end of each standard, a winding drum mounted upon the body, forward and rear pairs of cables connected to said winding drum and adapted to be wound thereon, each of said cables passing upward over the pulley on a corresponding standard then extending downward, and a plurality of pulleys for each cable operatively mounted below the wagon body and extending longitudinally thereof and over which said cable passes, said cable then extending upward and being fixedly connected to the upper end of the corresponding standard.

3. In a truck, supporting wheels each having an upward extending standard, movable axles slidingly engaging said standards, bolsters operatively supported upon said movable axles, the forward bolster being pivoted to the forward movable axle for rotation in a horizontal plane, and means mounted upon the body for vertically adjusting the movable axles upon said standards.

4. In a truck, supporting wheels having upwardly extending standards, a plurality of movable axles having sliding engagement with the standards, a wagon body, bolsters engaging the movable axles and supporting the wagon body, the forward bolster having horizontally rotative engagement with the corresponding axle, and means for lifting said axles with relation to the wheels to carry the body above the wheels to thereby permit the forward wheels to turn beneath the body.

5. In a truck of the character described, supporting wheels, vertically disposed sectional standards upon which said supporting wheels are mounted, the upper sections of the standards carrying the supporting wheels and being hinged to the lower sections, a wagon body vertically movable with relation to the supporting wheels and upon said standards, means for lifting or lowering the wagon body, means for detachably supporting the wheels upon the upper sections of the standards, and means for holding the upper sections of the standards in a vertical position.

6. A truck of the character described including forward and rear supporting wheels, standards operatively supported by said wheels extending above the wheels, a wagon body vertically movable between said standards, from a point below the axles of the wheels to a point above the wheels to thereby permit the wheels to cut under the wagon body, and manually operable means on the wagon body and operatively engaging the standards for raising the wagon body on the standards.

7. A mechanism of the character described, including vertically disposed forward and rear standards, a body vertically movable between said standards and guided thereby, a pulley in conjunction with the upper end of each standard, a winding drum disposed at one end of the structure, pairs of cables extending from the winding drum to the rear and forward ends of the body respectively, each passing up over the pulley on a corresponding standard, then extending downward, a pulley for each cable operatively mounted upon the body and over which the cable passes, the cable then extending upward and being fixedly connected to the upper end of a corresponding standard, the cables extending from the standards farthest away from the winding drum having a flight extending beneath the body.

In testimony whereof I hereunto affix my signature in the presence of two witnesses.

JOHN F. REEDER.

Witnesses:
W. E. Lowe,
J. C. Willard.

Copies of this patent may be obtained for five cents each, by addressing the "Commissioner of Patents, Washington, D. C."